United States Patent
Roach et al.

(10) Patent No.: US 12,435,640 B2
(45) Date of Patent: Oct. 7, 2025

(54) GAS TURBINE ENGINE VANE OUTER DIAMETER PLATFORM INTEGRATED WITH BLADE OUTER AIR SEAL

(71) Applicant: RTX CORPORATION, Farmington, CT (US)

(72) Inventors: James T. Roach, Vernon, CT (US); Jonas Banhos, West Hartford, CT (US); Russell Kim, Temecula, CA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/500,671

(22) Filed: Nov. 2, 2023

(65) Prior Publication Data
US 2025/0146421 A1    May 8, 2025

(51) Int. Cl.
*F01D 11/08*   (2006.01)
*F01D 5/18*    (2006.01)
*F01D 5/28*    (2006.01)
*F01D 9/06*    (2006.01)
*F01D 11/00*   (2006.01)

(52) U.S. Cl.
CPC .............. *F01D 11/08* (2013.01); *F01D 5/187* (2013.01); *F01D 5/188* (2013.01); *F01D 5/282* (2013.01); *F01D 5/284* (2013.01); *F01D 9/065* (2013.01); *F01D 11/001* (2013.01); *F05D 2240/81* (2013.01); *F05D 2300/6033* (2013.01); *F05D 2300/6034* (2013.01)

(58) Field of Classification Search
CPC ........ F01D 5/282; F01D 5/284; F01D 11/001; F01D 11/08; F01D 5/187; F01D 5/188; F01D 5/189; F01D 9/065; F01D 5/225; F05D 2300/6033; F05D 2300/6034; F05D 2260/20; F05D 2240/80; F05D 2240/81; F05D 2240/11
See application file for complete search history.

(56) References Cited

U.S. PATENT DOCUMENTS

| | | | | |
|---|---|---|---|---|
| 4,127,358 A | * | 11/1978 | Parkes | F01D 5/225 416/191 |
| 4,668,162 A | * | 5/1987 | Cederwall | B23B 51/00 415/115 |
| 5,142,859 A | * | 9/1992 | Glezer | F02C 7/18 60/806 |
| 5,482,435 A | * | 1/1996 | Dorris | F01D 5/225 415/115 |

(Continued)

OTHER PUBLICATIONS

European Search Report for EP Application No. 24209310.2 dated Jan. 8, 2025.

*Primary Examiner* — Christopher Verdier
(74) *Attorney, Agent, or Firm* — Carlson, Gaskey & Olds, P.C.

(57) ABSTRACT

A combined gas turbine engine vane and blade outer air seal assembly includes a vane having an airfoil extending from the leading edge to a trailing edge, and has an outer platform. The outer platform has a cooling channel that extends into the airfoil to receive cooling air. The outer platform extends to an integral blade outer air seal to be positioned radially outwardly of a turbine blade in a gas turbine engine. At least a portion of the vane and the blade outer air seal are formed of ceramic matrix composite materials. A gas turbine engine is also disclosed.

4 Claims, 6 Drawing Sheets

(56) References Cited

U.S. PATENT DOCUMENTS

| | | | | |
|---|---|---|---|---|
| 5,494,402 | A | * | 2/1996 | Glezer .................... F01D 9/042 |
| | | | | 415/176 |
| 10,822,985 | B2 | | 11/2020 | Clark et al. |
| 11,073,039 | B1 | * | 7/2021 | Whittle ................... F01D 11/08 |
| 11,174,752 | B2 | | 11/2021 | Dyson et al. |
| 2016/0061112 | A1 | * | 3/2016 | Hagan ..................... F01D 5/187 |
| | | | | 416/1 |
| 2018/0135460 | A1 | | 5/2018 | Barker et al. |
| 2018/0223681 | A1 | | 8/2018 | Gallier et al. |
| 2019/0162072 | A1 | * | 5/2019 | Parvis .................... F01D 5/282 |
| 2019/0338660 | A1 | * | 11/2019 | Underwood ............ F01D 9/041 |
| 2020/0072068 | A1 | * | 3/2020 | Takata .................... F01D 11/04 |
| 2021/0189901 | A1 | | 6/2021 | Dyson et al. |
| 2021/0231022 | A1 | | 7/2021 | Whittle et al. |
| 2022/0242079 | A1 | * | 8/2022 | Holaday ................. B30B 11/04 |

\* cited by examiner

GAS TURBINE ENGINE VANE OUTER DIAMETER PLATFORM INTEGRATED WITH BLADE OUTER AIR SEAL

BACKGROUND OF THE INVENTION

This application relates to a gas turbine engine vane that has a radially outer platform which includes an integrated blade outer air seal.

Gas turbine engines are known, and typically include a compressor section delivering compressed air into a combustor where it is mixed with fuel and ignited. Products of the combustion pass downstream over turbine rotors driving them to rotate. The turbine rotors in turn drive compressor rotors, and in some cases a propulsor rotor such as a fan or propeller.

It is known that the products of combustion are quite hot, and thus it is desirable to have cooling air provided to components in the turbine section. Moreover, it is desirable to control the flow of the products of combustion through the turbine section to provide a maximum efficiency to the turbine section. Thus, it is known to place static vanes having airfoils which direct flow of the products of combustion toward the plurality of turbine rotors. Moreover, it is known to have blade outer air seals positioned radially outwardly of turbine blades to ensure that the products of combustion do not pass over the turbine section without driving the turbine rotors.

Recently it has been proposed to utilize ceramic matrix composites ("CMCs") for several components in a gas turbine engine. The CMCs can withstand higher temperatures than many other materials.

SUMMARY OF THE INVENTION

In a featured embodiment, a combined gas turbine engine vane and blade outer air seal assembly includes a vane having an airfoil extending from the leading edge to a trailing edge, and has an outer platform. The outer platform has a cooling channel that extends into the airfoil to receive cooling air. The outer platform extends to an integral blade outer air seal to be positioned radially outwardly of a turbine blade in a gas turbine engine. At least a portion of the vane and the blade outer air seal are formed of ceramic matrix composite materials.

In another embodiment according to the previous embodiment, there are cooling air passages within the outer platform and the blade outer air seal and connected into the cooling channel such that air can be communicated from the cooling channel into the blade outer air seal.

In another embodiment according to any of the previous embodiments, the outer platform and the blade outer air seal are formed of a plurality of lamina of ceramic matrix composite materials.

In another embodiment according to any of the previous embodiments, at least some of the cooling air passages extend from the cooling channel to at least one outlet at an aft end spaced from the trailing edge of the airfoil.

In another embodiment according to any of the previous embodiments, the cooling passages extend from the cooling channel to at least one outlet extending radially inwardly of the blade outer air seal.

In another embodiment according to any of the previous embodiments, the blade outer air seal has a radially outwardly extending portion with the cooling air passages extending through the radially outwardly extending portion to at least one outlet at a radially outward end of the blade outer air seal.

In another embodiment according to any of the previous embodiments, the cooling air passages extend to a radially outwardly extending portion and then into outlets extending in an axially aft direction.

In another embodiment according to any of the previous embodiments, there is an enclosed portion of the blade outer air seal radially outward of the outlets.

In another embodiment according to any of the previous embodiments, the outer platform and the blade outer air seal are formed of a plurality of lamina of ceramic matrix composite materials.

In another embodiment according to any of the previous embodiments, an attachment structure is attached to the blade outer air seal portion on a radially outward side.

In another featured embodiment, a gas turbine engine includes a compressor section, a combustor section, and a turbine section. The turbine section includes a combined vane and blade outer air seal assembly having a vane having an airfoil extending from the leading edge to a trailing edge, and has an outer platform. The outer platform has a cooling channel that extends into the airfoil to receive cooling air. The outer platform extends to an integral blade outer air seal positioned radially outwardly of a turbine blade in the turbine section. At least a portion of the vane and the blade outer air seal is formed of ceramic matrix composite materials.

In another embodiment according to any of the previous embodiments, there are cooling air passages within the outer platform and the blade outer air seal and connected into the cooling channel such that air can be communicated from the cooling channel into the blade outer air seal.

In another embodiment according to any of the previous embodiments, the outer platform and the blade outer air seal are formed of a plurality of lamina of ceramic matrix composite materials.

In another embodiment according to any of the previous embodiments, at least some of the cooling air passages extend from the cooling channel to at least one outlet at an aft end spaced from the trailing edge of the airfoil.

In another embodiment according to any of the previous embodiments, the cooling passages extend from the cooling channel to at least one outlet extending radially inwardly of the blade outer air seal.

In another embodiment according to any of the previous embodiments, the blade outer air seal has a radially outwardly extending portion with the cooling air passages extending through the radially outwardly extending portion to at least one outlet at a radially outward end of the blade outer air seal.

In another embodiment according to any of the previous embodiments, the cooling air passages extend to a radially outwardly extending portion and then into outlets extending in an axially aft direction.

In another embodiment according to any of the previous embodiments, there is an enclosed portion of the blade outer air seal radially outward of the outlets.

In another embodiment according to any of the previous embodiments, the outer platform and the blade outer air seal are formed of a plurality of lamina of ceramic matrix composite materials.

In another embodiment according to any of the previous embodiments, an attachment structure is attached to the blade outer air seal portion on a radially outward side.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
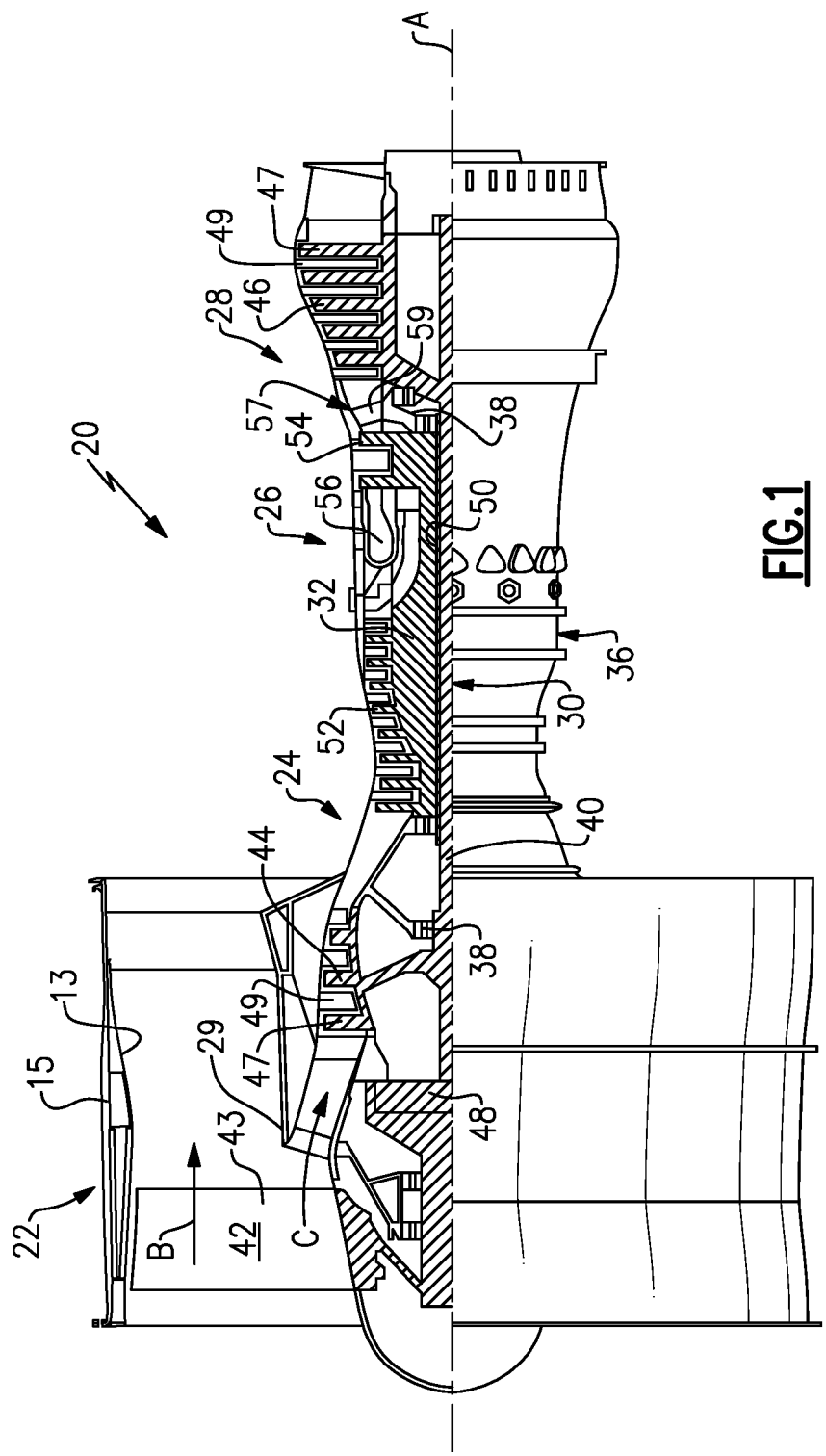
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(T_{ram} \,°R)/(518.7°\,R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F.

and 975.0° F. The relatively low EGT can be utilized in combination with the other techniques disclosed herein to reduce fuel consumption.

Figure 2:
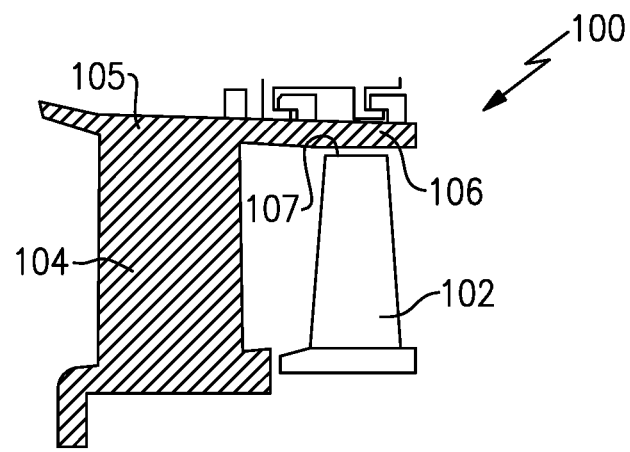
FIG. 2 schematically shows a turbine section including a combined turbine vane and blade outer air seal according to this disclosure.

FIG. 2 schematically shows a turbine section 100 having rotating turbine blades 102 and static vanes 104. The static vanes 104 have a radially outer platform 105 which is integrated with a blade outer air seal 106. As known, the blade outer air seal 106 is intended to be spaced closely to a radially outer blade tip 107 of the blade 102 to reduce leakage of products of combustion from avoiding driving the turbine blade 102.

By integrating the blade outer air seal 106 with the outer platform 105 the number of parts is reduced. Moreover, leakage between separate vane outer platforms and blade outer air seals is eliminated.

Figure 3:
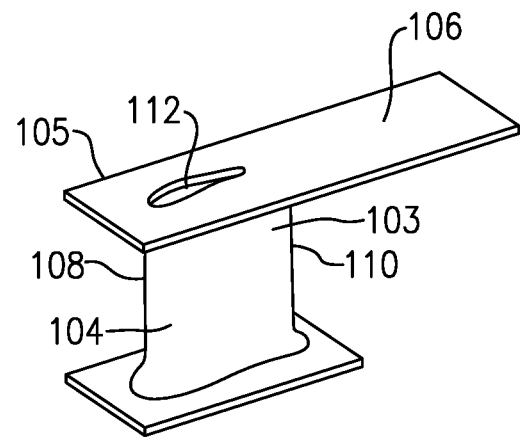
FIG. 3 shows a first embodiment.

FIG. 3 shows an embodiment wherein the blade outer air seal 106 is integrated with the outer platform 105. As can be seen, the vane 104 has airfoil 103 that extends from a leading edge 108 to a trailing edge 110.

A cooling channel 112 supplies cooling air from a source, as known, to cool the vane 104.

Figure 4:
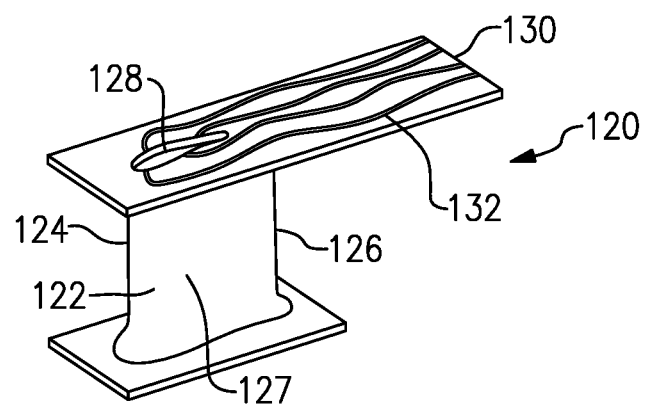
FIG. 4 shows a subsequent embodiment.

FIG. 4 shows an embodiment 120 wherein the vane 122 has its outer platform 105 integrated with a blade outer air seal 130. An airfoil 127 on vane 122 extends from a leading edge 124 to a trailing edge 126. Here cooling channels 132 communicate a cooling air passage 128 which extends through the vane 122 to cool the blade outer air seal 130. Channels 132 actually would not be at the outer surface of platform 105 and blade outer air seal 106. Instead, outer layers will close the channels 132, as disclosed below.

Figure 5A:
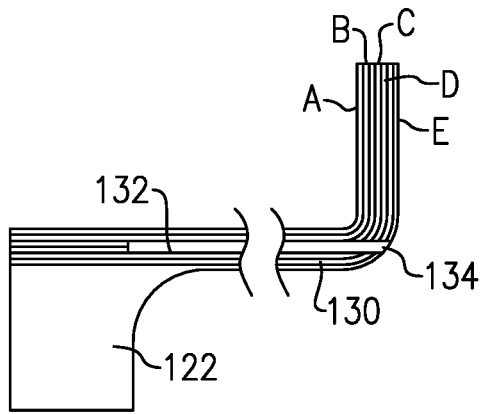
FIG. 5A shows a first alternative embodiment for the FIG. 4 embodiment.

FIG. 5A shows the cooling channels 132 communicating to the blade outer air seal 130, and to an exit 134 which is aft of the vane 122 and the blade outer air seal 130. As can be appreciated, the combined vane and blade outer air seal 120 are formed of a plurality of plies A, B, C, D, E which are formed of ceramic matrix composite materials ("CMCs").

Each of the disclosed embodiments are formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Figure 5B:
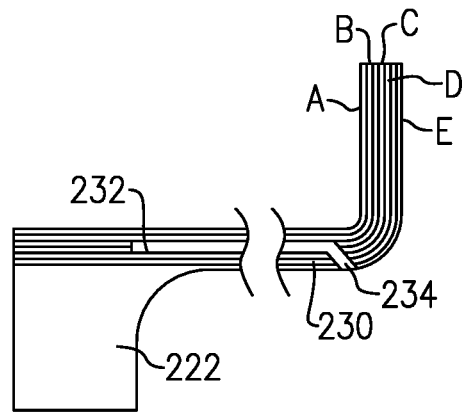
FIG. 5B shows an alternative embodiment.

As shown in FIG. 5B, vane 222 has the cooling air passages 232 extend into the blade outer air seal 230 and exit at a radially inboard location 234.

Figure 5C:
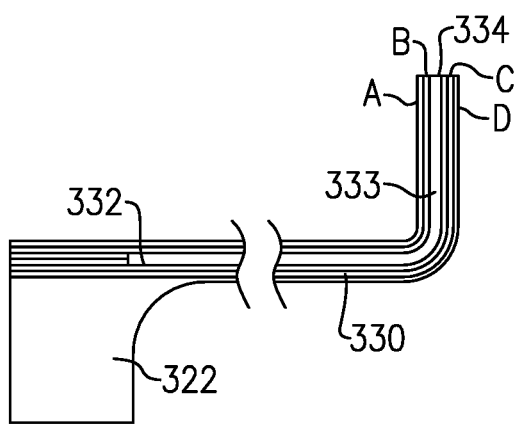
FIG. 5C shows an alternative embodiment.

As shown in FIG. 5C, vane 322 has the blade outer air seal cooling passages 332 extend into the blade outer air seal area 330, and then extend radially outwardly through passage 333 to an outlet 334.

Figure 5D:
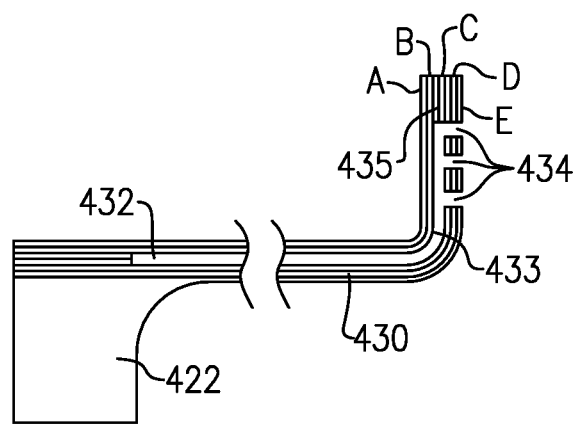
FIG. 5D shows an alternative embodiment.

As shown in FIG. 5D, the vane 422 has cooling air passages 432 for the blade outer air seal 430 extending to a radially outwardly extending portion 433, and into aft extending outlets 434. In this embodiment, there is an area 435 radially outwardly of the outlets 434 which does not include the outlets.

Figure 6A:
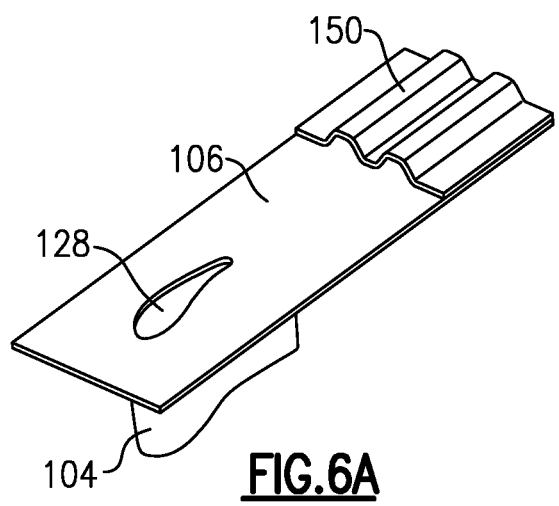
FIG. 6A shows a first support embodiment for the blade outer air seal.

FIG. 6A shows an attachment feature 150 which would be secured to the blade outer air seal portion 106 such that it can be mounted to static structure in a gas turbine engine. In this embodiment, the attachment portion 150 is a rail attachment.

Figure 6B:
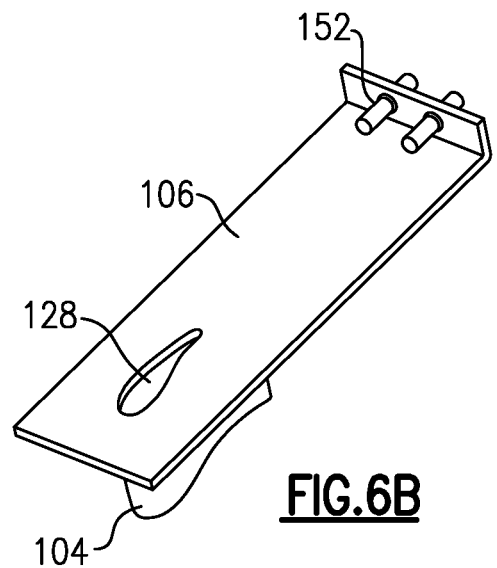
FIG. 6B shows an alternative support.

FIG. 6B shows an embodiment wherein the attachment portion 152 has pins which would secure the blade outer air seal 106 to static structure.

Figure 6C:
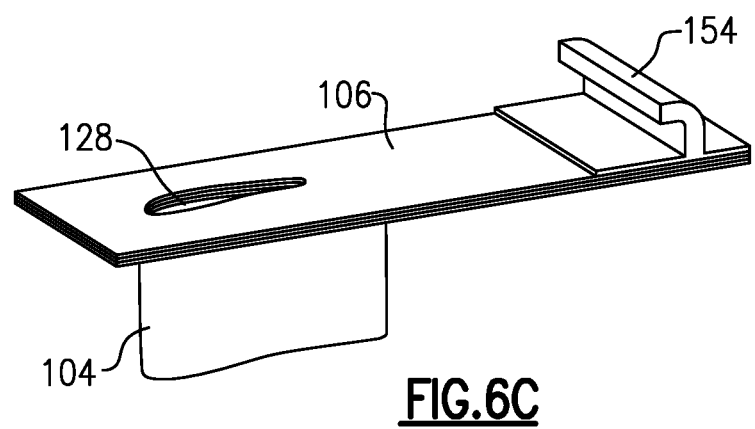
FIG. 6C shows another alternative support.

FIG. 6C shows an embodiment wherein there is a hook attachment 154 secured to the blade outer air seal portion 106. Again, the hook area 154 would be secured to a static structure hook.

The attachment structures of FIGS. 6A-6C may be formed of materials other than CMCs.

Figure 7:
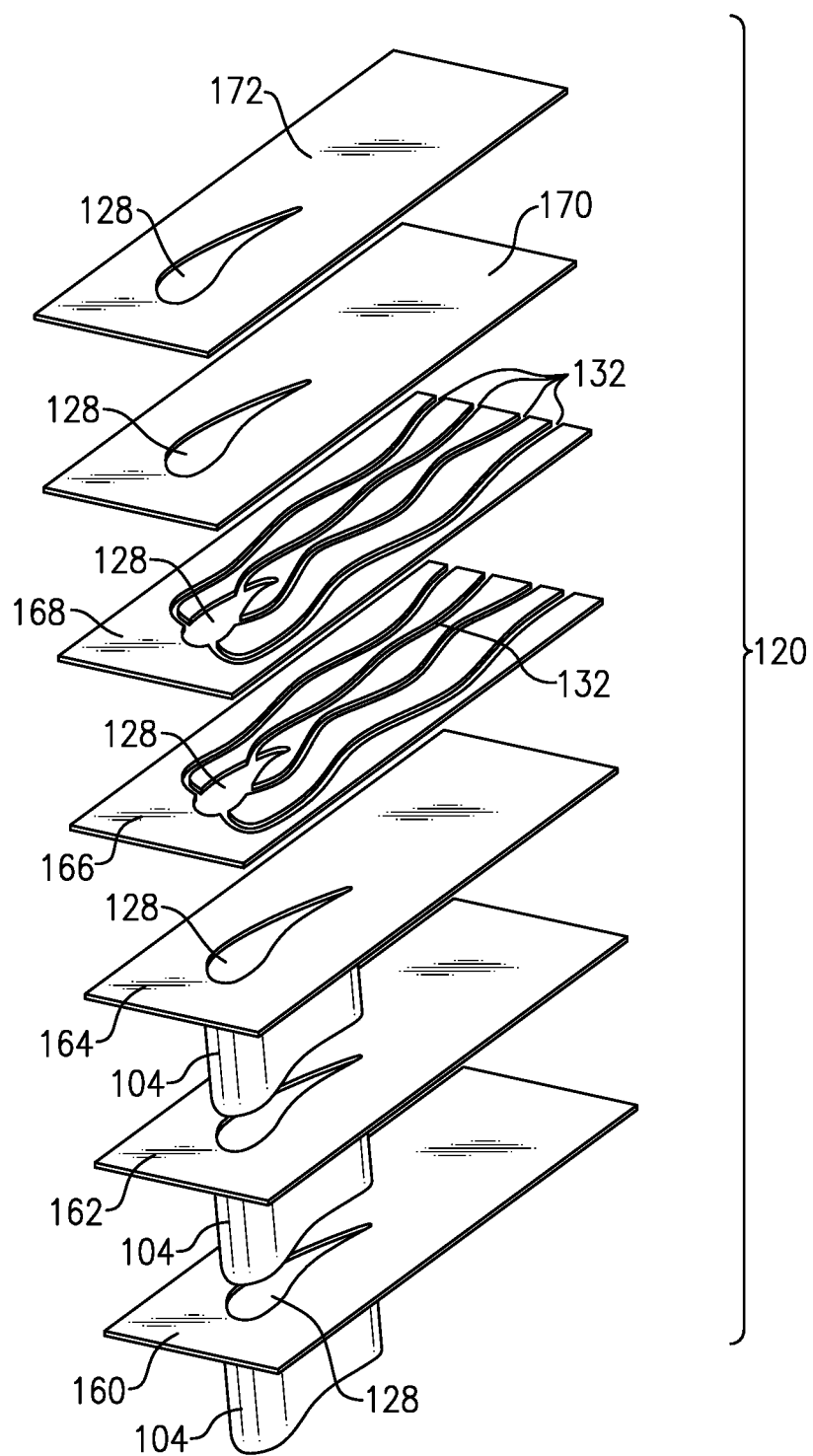
FIG. 7 schematically shows a layup of a plurality of plies to form the integrated vane and blade outer air seal of this disclosure.

FIG. 7 shows a method of forming a combined blade outer air seal and static vane 120. In this embodiment, a plurality of lamina 160, 162, 164, 166, 168, 170 and 172 are assembled together. All of the laminae are formed with part of the blade outer air seal 130. Each of the lamina have an opening 128 for the central cooling passage. Some of the lamina have the airfoil 127, including laminate 160, 162 and 164. Others of the lamina do not have the airfoil 127, including laminate 166, 168, 170 and 172. Laminate 166 and 168 have cooling air channels 132 communicating the central air cooling passage 128 into the blade outer air seal portion.

Figure 8A:
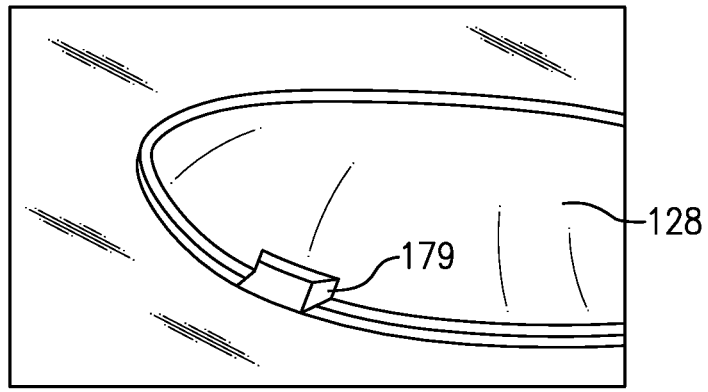
FIG. 8A shows a first embodiment of an air supply.

FIG. 8A shows opening 179 from the cooling air channel 128 to communicate cooling air into the passages 132. The opening 179 can be formed into the laminas in this embodiment.

Figure 8B:
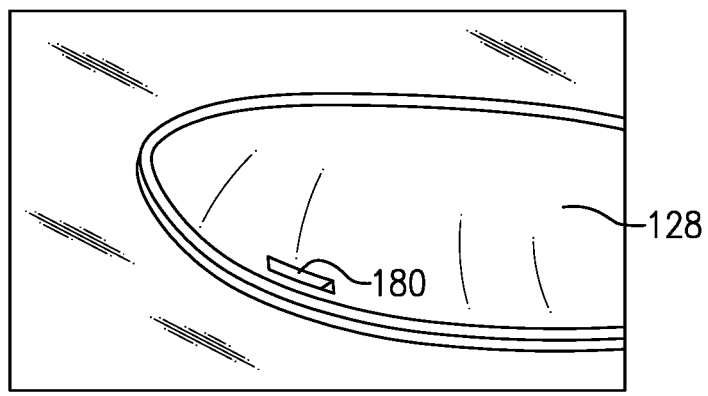
FIG. 8B shows an alternative embodiment.

As an alternative, FIG. 8B shows openings 180 which can be machined into the several lamina to communicate passage 128 into the passages 132.

A combined gas turbine engine vane and blade outer air seal assembly under this disclosure could be said to include a vane having an airfoil extending from the leading edge to a trailing edge, and having an outer platform. The outer platform has a cooling channel that extends into the airfoil to receive cooling air. The outer platform extends to an integral blade outer air seal to be positioned radially outwardly of a turbine blade in a gas turbine engine. At least a portion of the vane and the blade outer air seal is formed of ceramic matrix composite materials.

Although embodiments have been disclosed, a worker of ordinary skill in this art would recognize that several modifications would come within the scope of this disclosure. Thus, the following claims should be studied to determine the true scope and content of this disclosure.

What is claimed is:

1. A combined gas turbine engine vane and blade outer air seal assembly comprising:
   a vane having an airfoil extending from a leading edge to a trailing edge, and having an outer platform, the outer platform having a cooling channel that extends into the airfoil to receive cooling air;
   the outer platform extending to an integral blade outer air seal to be positioned radially outwardly of a turbine blade in a gas turbine engine;
   at least a portion of said vane and said blade outer air seal formed of ceramic matrix composite materials;
   wherein there are cooling air passages within said outer platform and said blade outer air seal and connected into the cooling channel such that the cooling air can be communicated from the cooling channel into said blade outer air seal; and wherein the cooling air passages extend to a radially outwardly extending portion and then into outlets extending in an axially aft direction.

2. The assembly as set forth in claim 1, wherein there is an enclosed portion of the blade outer air seal radially outward of the outlets.

3. A gas turbine engine comprising:

a compressor section, a combustor section, and a turbine section, the turbine section including a combined vane and blade outer air seal assembly having a vane having an airfoil extending from a leading edge to a trailing edge, and having an outer platform, the outer platform having a cooling channel that extends into the airfoil to receive cooling air;

the outer platform extending to an integral blade outer air seal positioned radially outwardly of a turbine blade in the turbine section;

at least a portion of said vane and said blade outer air seal formed of ceramic matrix composite materials;

wherein there are cooling air passages within said outer platform and said blade outer air seal and connected into the cooling channel such that the cooling air can be communicated from the cooling channel into said blade outer air seal; and wherein the cooling air passages extend to a radially outwardly extending portion and then into outlets extending in an axially aft direction.

4. The gas turbine engine as set forth in claim 3, wherein there is an enclosed portion of the blade outer air seal radially outward of the outlets.

* * * * *